United States Patent
Doddegowda et al.

(10) Patent No.: US 11,252,090 B1
(45) Date of Patent: Feb. 15, 2022

(54) SYSTEMS AND METHODS FOR PREDICTING FUTURE TRAFFIC LOADS OF OUTGOING INTERFACES ON NETWORK DEVICES

(71) Applicant: Juniper Networks, Inc., Sunnyvale, CA (US)

(72) Inventors: Madhu Byrapura Doddegowda, Sunnyvale, CA (US); Prashanth Ramaprasad, Sunnyvale, CA (US); Ronald Bonica, Sunnyvale, CA (US)

(73) Assignee: Juniper Networks, Inc, Sunnyvale, CA (US)

( * ) Notice: Subject to any disclaimer, the term of this patent is extended or adjusted under 35 U.S.C. 154(b) by 217 days.

(21) Appl. No.: 16/702,565

(22) Filed: Dec. 4, 2019

(51) Int. Cl.
*H04L 12/801* (2013.01)
*H04L 12/24* (2006.01)
*H04L 12/26* (2006.01)
*H04L 12/803* (2013.01)

(52) U.S. Cl.
CPC ........ *H04L 47/127* (2013.01); *H04L 41/0816* (2013.01); *H04L 43/04* (2013.01); *H04L 47/125* (2013.01)

(58) Field of Classification Search
None
See application file for complete search history.

(56) References Cited

U.S. PATENT DOCUMENTS

| | | | | |
|---|---|---|---|---|
| 7,420,929 B1* | 9/2008 | Mackie | ................. | H04L 43/026 370/252 |
| 7,945,658 B1* | 5/2011 | Nucci | ................... | H04L 41/065 709/224 |
| 8,953,623 B1* | 2/2015 | Eyada | .................. | H04L 47/125 370/401 |
| 2002/0141343 A1* | 10/2002 | Bays | .................. | H04L 41/0893 370/235 |
| 2005/0071469 A1* | 3/2005 | McCollom | .......... | H04L 67/1002 709/225 |
| 2005/0201302 A1* | 9/2005 | Gaddis | .................... | H04L 45/02 370/254 |
| 2006/0165009 A1* | 7/2006 | Nguyen | ................. | H04L 45/04 370/252 |
| 2007/0271374 A1* | 11/2007 | Shomura | ............... | H04L 43/022 709/224 |
| 2010/0034102 A1* | 2/2010 | Wang | ................. | H04L 41/0893 370/252 |

(Continued)

*Primary Examiner* — Ajit Patel
*Assistant Examiner* — Liem H. Nguyen
(74) *Attorney, Agent, or Firm* — FisherBroyles, LLP

(57) ABSTRACT

A disclosed method may include (1) sampling traffic forwarded by a network device in accordance with certain prefixes, (2) determining, based at least in part on the sampling of traffic, a subset of the prefixes whose usages satisfy a certain threshold, (3) computing a plurality of hit probabilities that each represent a relative likelihood that one of the subset of prefixes is used by the network device to forward the traffic, (4) identifying a plurality of outgoing interfaces that carry the traffic in connection with the subset of prefixes, (5) identifying a plurality of prefix-specific loads of the outgoing interfaces, and then (6) predicting a plurality of future traffic loads of the outgoing interfaces based at least in part on (A) the hit probabilities of the subset of prefixes and (B) the prefix-specific loads of the outgoing interfaces. Various other systems and methods are also disclosed.

18 Claims, 12 Drawing Sheets

(56) References Cited

U.S. PATENT DOCUMENTS

| | | | |
|---|---|---|---|
| 2013/0028095 A1* | 1/2013 | Vasseur | H04L 61/6059 |
| | | | 370/241 |
| 2013/0219081 A1* | 8/2013 | Qian | H04L 45/02 |
| | | | 709/241 |
| 2014/0100766 A1* | 4/2014 | Masutani | G08G 1/0141 |
| | | | 701/117 |
| 2014/0310427 A1* | 10/2014 | Shaw | H04L 61/2007 |
| | | | 709/244 |
| 2015/0029864 A1* | 1/2015 | Raileanu | H04L 45/70 |
| | | | 370/237 |
| 2016/0021011 A1* | 1/2016 | Vasseur | H04L 47/127 |
| | | | 370/235 |
| 2016/0028637 A1* | 1/2016 | Vasseur | H04L 47/25 |
| | | | 370/235 |
| 2016/0261516 A1* | 9/2016 | Gopinathan | H04L 47/127 |
| 2017/0126416 A1* | 5/2017 | McCormick | H04L 12/1877 |
| 2017/0359261 A1* | 12/2017 | Avci | H04L 47/127 |
| 2018/0026891 A1* | 1/2018 | Vasseur | H04L 47/127 |
| | | | 370/235 |
| 2018/0137412 A1* | 5/2018 | Nikkhah | G06N 3/0445 |
| 2018/0205634 A1* | 7/2018 | Avci | H04L 45/24 |
| 2018/0367498 A1* | 12/2018 | Bliss | H04L 61/1511 |
| 2019/0311385 A1* | 10/2019 | Kawaguchi | G06Q 30/0205 |
| 2019/0319881 A1* | 10/2019 | Maskara | H04L 41/0896 |
| 2020/0036639 A1* | 1/2020 | Huberman | H04L 47/125 |
| 2020/0092176 A1* | 3/2020 | Huberman | H04L 41/147 |
| 2020/0396163 A1* | 12/2020 | Koral | H04L 47/11 |

\* cited by examiner

| Prefix Statistics 500 | |
|---|---|
| PREFIXES | HIT COUNTS |
| Prefix 424 | 1,000,000 |
| Prefix 426 | 900,000 |
| Prefix 428 | 600,000 |
| Prefix 430 | 800,000 |
| Prefix 440(1) | 20,000 |
| Prefix 440(2) | 25,000 |
| Prefix 440(3) | 0 |
| Prefix 440(4) | 0 |
| ⋮ | ⋮ |

FIG. 5

```
Hit Probability Computation
           600
------------------------------------------------------------
************************************************

PREFIX: Prefix 424

FORMULA: Hit Count of Prefix 424 ÷ Sum of All Prefix Hits for Subset of Prefixes 124

SUM OF PREFIX HITS FOR SUBSET OF PREFIXES 124: 3,300,000

HIT PROBABILITY: 1,000,000 ÷ 3,300,000 = 30.3%

```
Prefix-Weighted Load Computation
              700
------------------------------------------------------------------------
****************************************************

PREFIX: Prefix 424

OUTGOING INTERFACES ASSOCIATED WITH PREFIX: Outgoing Interface 402
                                            Outgoing Interface 404
                                            Outgoing Interface 406

FORMULA: Hit Probability of Prefix 424 X Prefix-Specific Load of Outgoing Interface 402

HIT PROBABILITY OF PREFIX 424: 30.3%

PREFIX-SPECIFIC LOAD OF OUTGOING INTERFACE 402: 40%

PREFIX-WEIGHTED LOAD: 30.3% X 40% = 12.12%

```
Hit Probability Computation
               800
--------------------------------------------------------
************************************************

PREFIX: Prefix 426

FORMULA: Hit Count of Prefix 426 ÷ Sum of All Prefix Hits for Subset of Prefixes 124

SUM OF PREFIX HITS FOR SUBSET OF PREFIXES 124: 3,300,000

HIT PROBABILITY: 900,000 ÷ 3,300,000 = 27.3%

```
Prefix-Weighted Load Computation
              900
----------------------------------------------------------------------
**************************************************

PREFIX: Prefix 426

OUTGOING INTERFACES ASSOCIATED WITH PREFIX: Outgoing Interface 402
                                            Outgoing Interface 408
                                            Outgoing Interface 410

FORMULA: Hit Probability of Prefix 426 X Prefix-Specific Load of Outgoing Interface 402

HIT PROBABILITY OF PREFIX 426: 27.3%

PREFIX-SPECIFIC LOAD OF OUTGOING INTERFACE 402: 30%

PREFIX-WEIGHTED LOAD: 27.3% X 30% = 8.19%

Total Weighted Load Computation
1000

OUTGOING INTERFACE: Outgoing Interface 402

FORMULA: Sum of All Relevant Prefix-Weighted Loads

TOTAL WEIGHTED LOAD: 12.12% + 8.19% + 1.3% + 1.1% = 22.71%

*FIG. 10*

```
┌─────────────────────────────────────────────────────────────────────────┐
│                    Predicted Future Traffic Load Computation             │
│                                    1100                                  │
│                                                                          │
│  ----------------------------------------------------------------------  │
│  ***************************************************                    │
│                                                                          │
│  OUTGOING INTERFACE: Outgoing Interface 402                              │
│                                                                          │
│  FORMULA: Total Weighted Load of Outgoing Interface 402 ÷ Sum of All Total Weighted Loads │
│                                                                          │
│  PREDICTED FUTURE TRAFFIC LOAD: 22.71% ÷ 99% = 22.94%                    │
│                                                                          │
│  ***************************************************                    │
│  ----------------------------------------------------------------------  │
```

*FIG. 11*

SYSTEMS AND METHODS FOR PREDICTING FUTURE TRAFFIC LOADS OF OUTGOING INTERFACES ON NETWORK DEVICES

BACKGROUND

The topology and/or configuration of a network may change over time. For example, a router may be added to or removed from a network at any given time. Additionally or alternatively, one router may replace another router within a network at any given time.

Such topology and/or configuration changes may necessitate and/or cause the reprogramming of Forwarding Information Bases (FIBs) on network devices within the network. As a result of these topology and/or configurations, certain interfaces located on those network devices may carry and/or experience heavy and/or unsustainable traffic loads. In an effort to address such heavy and/or unsustainable traffic loads, some traditional network devices may take certain remedial measures (e.g., redistribution of traffic loads, etc.).

However, these traditional network devices may be forced to take such remedial measures only in reaction and/or response to outbound traffic statistics. Accordingly, such remedial measures may be wholly reactionary in nature. Unfortunately, the reactionary nature of these remedial measures may cause certain delays that limit and/or undermine the effectiveness and/or purpose of such remedial measures. The instant disclosure, therefore, identifies and addresses a need for additional and improved systems and methods for predicting future traffic loads of outgoing interfaces on network devices.

SUMMARY

As will be described in greater detail below, the instant disclosure generally relates to systems and methods for predicting future traffic loads of outgoing interfaces on network devices. In one example, a method for accomplishing such a task may include (1) sampling, over a certain period of time, traffic forwarded by a network device in accordance with prefixes stored in a forwarding information base, (2) determining, based at least in part on the sampling of traffic, a subset of the prefixes whose usages satisfy a certain threshold relative to the prefixes as a whole over the certain period of time, (3) computing, for the subset of prefixes, a plurality of hit probabilities that each represent a relative likelihood that one of the subset of prefixes is used by the network device to forward the traffic over the certain period of time, (4) identifying a plurality of outgoing interfaces that carry the traffic in connection with the subset of prefixes, (5) identifying a plurality of prefix-specific loads of the outgoing interfaces, and then (6) predicting a plurality of future traffic loads of the outgoing interfaces based at least in part on (A) the hit probabilities of the subset of prefixes and (B) the prefix-specific loads of the outgoing interfaces.

Similarly, a system that implements the above-identified method may include a physical processor configured to execute various modules stored in memory. In one example, this system may include and/or execute (1) a sampling module that samples, over a certain period of time, traffic forwarded by a network device in accordance with prefixes stored in a forwarding information base, (2) a determination module that determines, based at least in part on the sampling of traffic, a subset of the prefixes whose usages satisfy a certain threshold relative to the prefixes as a whole over the certain period of time, (3) a computation module that computes, for the subset of prefixes, a plurality of hit probabilities that each represent a relative likelihood that one of the subset of prefixes is used by the network device to forward the traffic over the certain period of time, (4) an identification module that (A) identifies a plurality of outgoing interfaces that carry the traffic in connection with the subset of prefixes and (B) identifies a plurality of prefix-specific loads of the outgoing interfaces, and (5) a prediction module that predicts a plurality of future traffic loads of the outgoing interfaces based at least in part on (A) the hit probabilities of the subset of prefixes and (B) the prefix-specific loads of the outgoing interfaces.

Additionally or alternatively, a non-transitory computer-readable medium that implements the above-identified method may include one or more computer-executable instructions. When executed by at least one processor of a computing device, the computer-executable instructions may cause the computing device to (1) sample, over a certain period of time, traffic forwarded by a network device in accordance with prefixes stored in a forwarding information base, (2) determine, based at least in part on the sampling of traffic, a subset of the prefixes whose usages satisfy a certain threshold relative to the prefixes as a whole over the certain period of time, (3) compute, for the subset of prefixes, a plurality of hit probabilities that each represent a relative likelihood that one of the subset of prefixes is used by the network device to forward the traffic over the certain period of time, (4) identify a plurality of outgoing interfaces that carry the traffic in connection with the subset of prefixes, (5) identify a plurality of prefix-specific loads of the outgoing interfaces, and then (6) predict a plurality of future traffic loads of the outgoing interfaces based at least in part on (A) the hit probabilities of the subset of prefixes and (B) the prefix-specific loads of the outgoing interfaces.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is an illustration of exemplary prefix statistics.

FIG. 6 is an illustration of an exemplary hit probability computation.

FIG. 7 is an illustration of an exemplary prefix-weighted load computation.

FIG. 8 is an illustration of an additional exemplary hit probability computation.

FIG. 9 is an illustration of an additional exemplary prefix-weighted load computation.

FIG. 10 is an illustration of an exemplary total weighted load computation.

FIG. 11 is an illustration of an exemplary predicted future traffic load computation.

Figure 1:
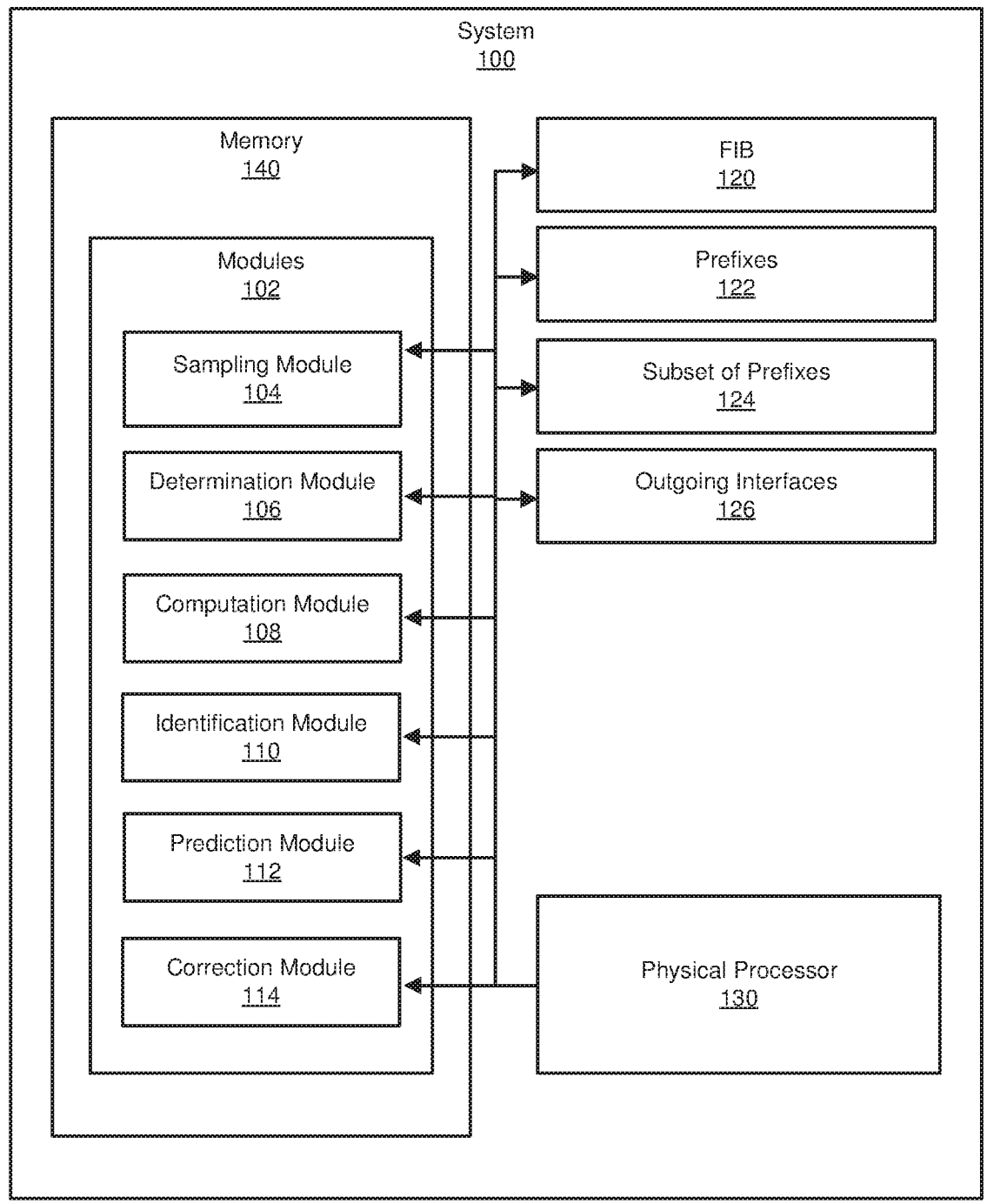
FIG. 1 is a block diagram of an exemplary system for predicting future traffic loads of outgoing interfaces on network devices.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for predicting future traffic loads of outgoing interfaces on network devices. As will be explained in greater detail below, embodiments of the instant disclosure may sample traffic forwarded by a network device over a certain time period. The sampled traffic may be routed and/or forwarded in accordance with routes and/or prefixes stored in a FIB of the network device. Upon completion of the sample period, embodiments of the instant disclosure may determine which of the prefixes stored in the FIB were used to route and/or forward the most traffic. In other words, embodiments of the instant disclosure may identify and/or determine those prefixes whose usages satisfy a certain threshold relative to all the prefixes stored in the FIB.

Upon identifying and/or determining those high-traffic prefixes (sometimes also referred to as frequently hit prefixes), embodiments of the instant disclosure may compute hit probabilities for those high-traffic prefixes. In this example, the hit probability of a prefix may refer to and/or represent the relative likelihood that the prefix is used to forward a packet by the network device over the sample period. Embodiments of the instant disclosure may identify and/or determine the outgoing interfaces associated with the high-traffic prefixes as well as their respective traffic loads over the sample period.

As will be described in greater detail below, by analyzing the hit probabilities of the high-traffic prefixes and/or the recent traffic loads of the outgoing interfaces associated with the high-traffic prefixes, these embodiments may be able to fairly accurately predict the future traffic loads of those outgoing interfaces. By doing so, these embodiments may enable the network device to compare the predicted future traffic loads of the outgoing interfaces and then perform one or more corrective and/or remedial actions. Examples of such actions include, without limitation, load-balancing the outgoing interfaces to account for the predicted future traffic loads, upgrading at least one of the outgoing interfaces, modifying a configuration of at least one of the outgoing interfaces, combinations or variations of one or more of the same, and/or any other suitable actions.

Figure 2:
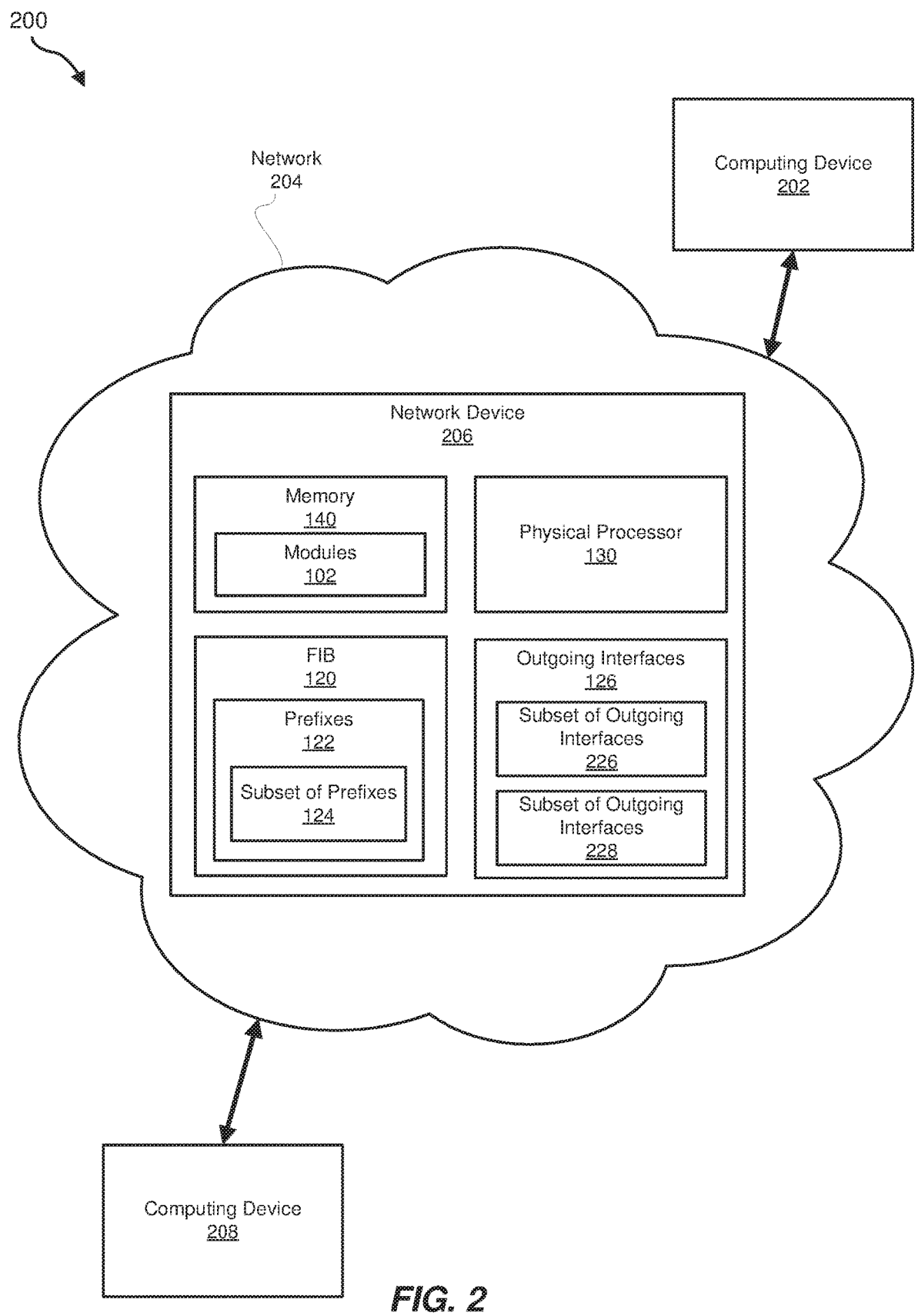
FIG. 2 is a block diagram of an additional exemplary system for predicting future traffic loads of outgoing interfaces on network devices.
Figure 3:
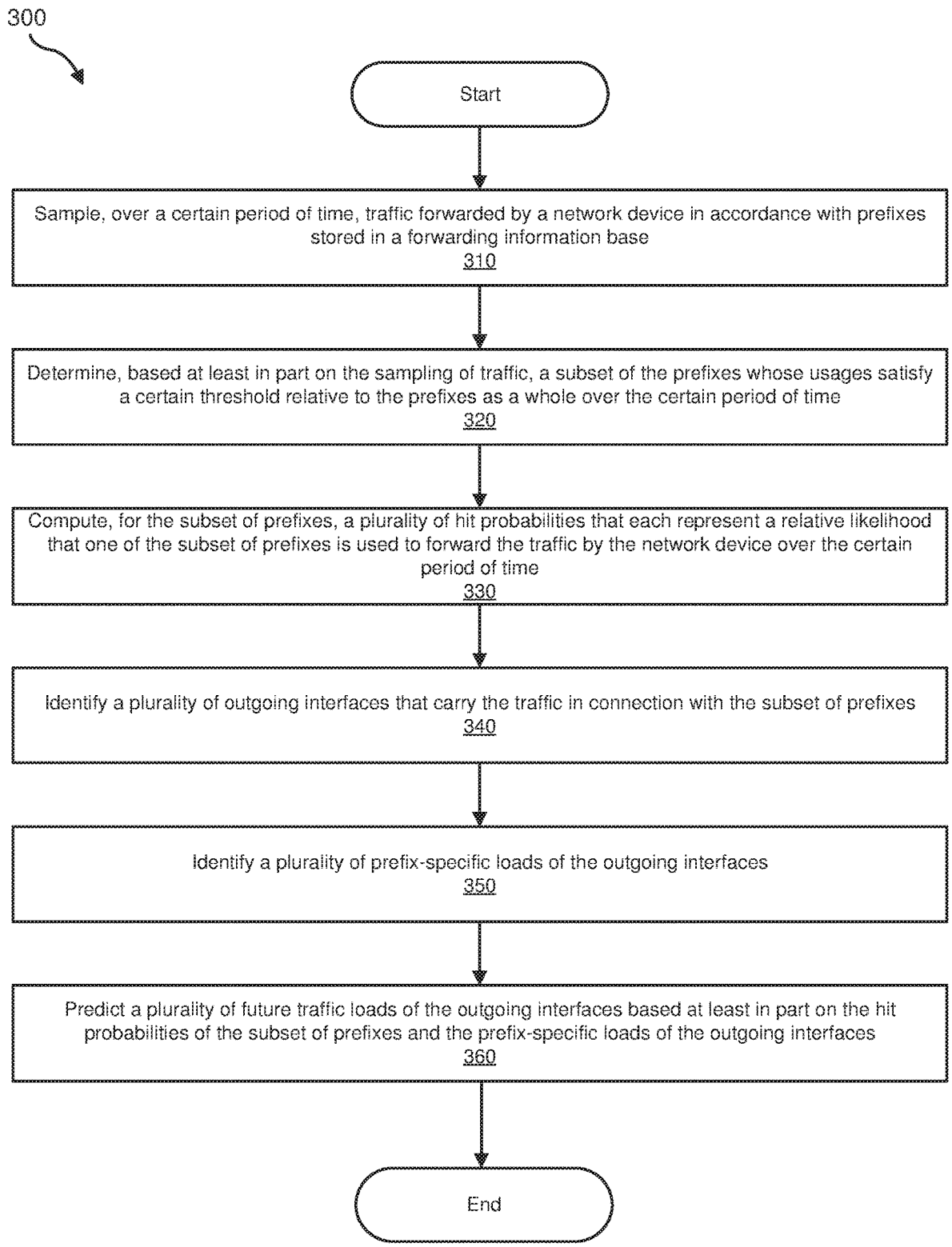
FIG. 3 is a flow diagram of an exemplary method for predicting future traffic loads of outgoing interfaces on network devices.
Figure 4:
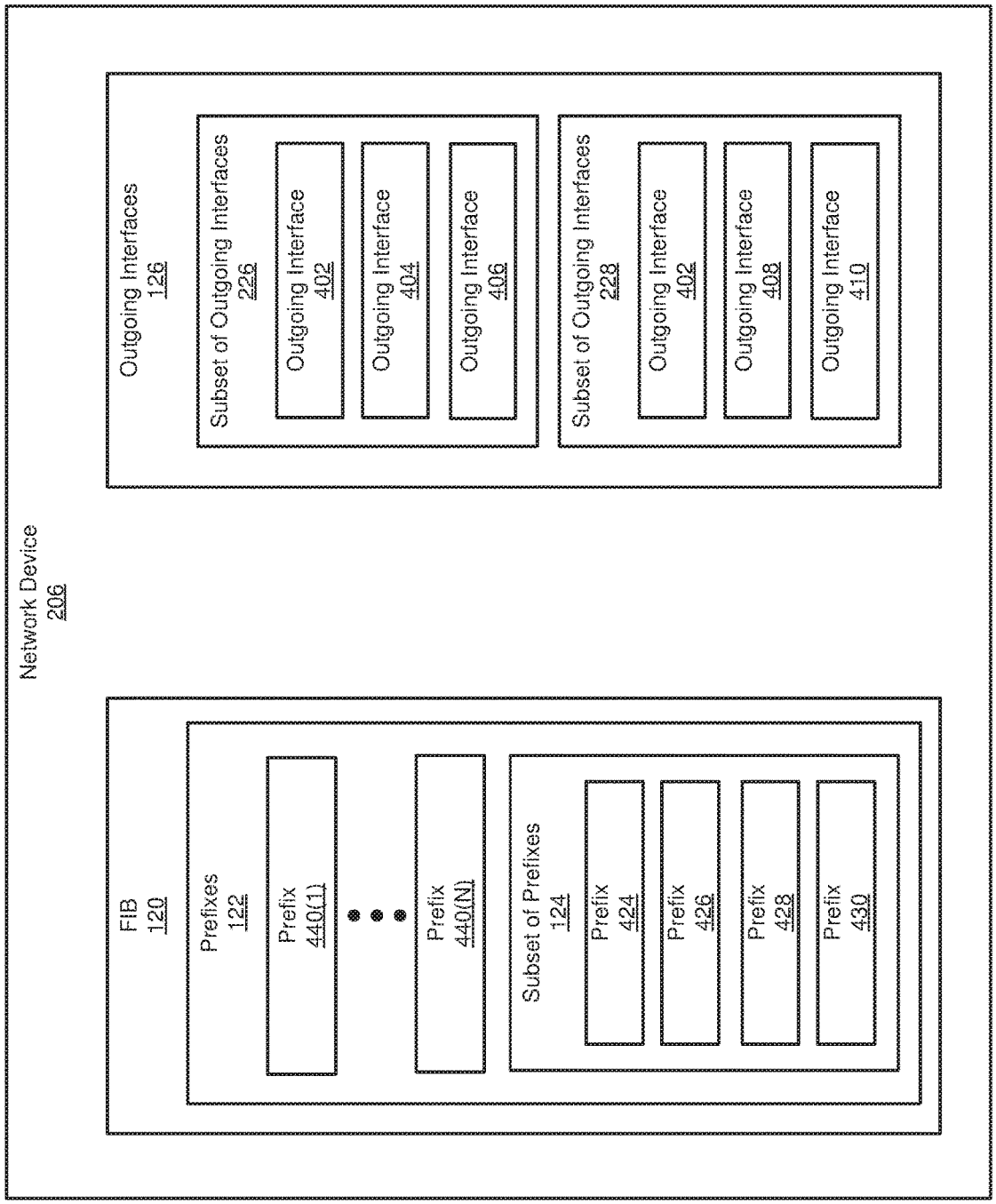
FIG. 4 is a block diagram of a network device capable of predicting future traffic loads of outgoing interfaces on network devices.

The following will provide, with reference to FIGS. 1, 2, and 4 detailed descriptions of exemplary systems and corresponding implementations for predicting future traffic loads of outgoing interfaces on network devices. Detailed descriptions of exemplary prefix statistics, hit probability computations, prefix-weighted load computations, and/or total weighted load computations will be provided in connection with FIGS. 5-10. Detailed descriptions of computer-implemented methods for predicting future traffic loads of outgoing interfaces on network devices will be provided in connection with FIG. 3. In addition, detailed descriptions of an exemplary computing system for carrying out these methods will be provided in connection with FIG. 12.

FIG. 1 shows an exemplary system 100 that facilitates predicting future traffic loads of outgoing interfaces on network devices. As illustrated in FIG. 1, system 100 may include one or more modules 102 for performing one or more tasks. As will be explained in greater detail below, modules 102 may include a sampling module 104, a determination module 106, a computation module 108, an identification module 110, a prediction module 112, and/or a correction module 114. Although illustrated as separate elements, one or more of modules 102 in FIG. 1 may represent portions of a single module, application, and/or operating system.

In certain embodiments, one or more of modules 102 in FIG. 1 may represent one or more software applications or programs that, when executed by a processor of a computing device, cause the computing device to perform one or more tasks. For example, and as will be described in greater detail below, one or more of modules 102 may represent modules stored and configured to run on one or more computing devices, such as the devices illustrated in FIG. 2 (e.g., computing device 202, computing device 208, and/or network device 206). One or more of modules 102 in FIG. 1 may also represent all or portions of one or more special-purpose computers configured to perform one or more tasks.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate predicting future traffic loads of outgoing interfaces on network devices. Examples of physical processor 130 include, without limitation, Central Processing Units (CPUs), microprocessors, microcontrollers, Field-Programmable Gate Arrays (FPGAs) that implement softcore processors, Application-Specific Integrated Circuits (ASICs), Systems on a Chip (SoCs), portions of one or more of the same, variations or combinations of one or more of the same, and/or any other suitable physical processor.

As illustrated in FIG. 1, exemplary system 100 may further include one or more FIBs, such as FIB 120. In some examples, FIB 120 may include and/or represent a forwarding table, forwarding plane, and/or database that stores networking objects that facilitate forwarding traffic within a network. In one example, FIB 120 may be stored, maintained, and/or located within kernel space on a physical computing device. Additionally or alternatively, FIB 120 may be incorporated into, allocated to, and/or represent part of a virtual router. Accordingly, FIB 120 may be hosted by a physical device and/or allocated to a virtual router for use by a network consumer and/or subscriber.

As illustrated in FIG. 1, exemplary system 100 may additionally include, store, and/or maintain one or more prefixes, such as prefixes 122. In some examples, prefixes 122 may include and/or represent routes, data, and/or information that identify or refer to a portion of a network, network device, and/or network interface. In one example, prefixes 122 may each identify and/or represent a path capable of carrying traffic within a network and/or across networks. Additionally or alternatively, prefixes 122 may include and/or contain data representations of and/or references to one or more physical devices or interfaces (such an "ifd"), logical devices or interfaces (such as an "ifl"), next hops, and/or path segments. Examples of prefixes 122 include, without limitation, Internet Protocol (IP) prefixes (such as IPv4 and/or IPv6 prefixes), Multiprotocol Label Switching (MPLS) prefixes, Virtual Private Local Area Network Service (VLAN) prefixes, Border Gateway Protocol (BGP) prefixes, Open Shortest Path First (OSPF) prefixes, variations or combinations of one or more of the same, and/or any other suitable prefixes.

In some examples, prefixes 122 may include and/or represent a collection of all the prefixes stored and/or loaded in FIB 120. In one example, prefixes 122 may include and/or contain a subset of prefixes 124 whose usages satisfy a certain threshold over a certain period of time. For example, subset of prefixes 124 may include and/or represent the prefixes stored in FIB 120 that were used to route and/or forward the most traffic over a certain sample period. In other words, subset of prefixes 124 may be the most frequently hit prefixes and/or the highest-traffic prefixes stored in FIB 120.

As illustrated in FIG. 1, exemplary system 100 may also include and/or represent one or more interfaces, such as outgoing interfaces 126. In some examples, outgoing interfaces 126 may include and/or represent devices and/or components that facilitate the flow of traffic within a network. In one example, outgoing interfaces 126 may include and/or represent physical devices and/or virtual components. Examples of outgoing interfaces 126 include, without limitation, physical interfaces, Gigabit Ethernet (GE) interfaces, 10-Gigabit Ethernet (XE) interfaces, Ten GE interfaces, Asynchronous Transfer Mode (ATM) interfaces, Frame Relay interfaces, egress interfaces, ingress interfaces, communication ports, Packet Forwarding Engines (PFEs), Physical Interface Cards (PICs), Flexible PIC Concentrators (FPCs), Switch Interface Boards (SIBs), control boards, connector interface panels, line cards, portions of one or more of the same, combinations or variations of one or more of the same, and/or any other suitable outgoing interfaces.

An apparatus for predicting future traffic loads of outgoing interfaces on network devices may include all or portions of exemplary system 100. In some examples, system 100 in FIG. 1 may be implemented in a variety of ways. For example, all or a portion of exemplary system 100 may represent portions of exemplary system 200 in FIG. 2. As shown in FIG. 2, system 200 may include a network 204 that facilitates communication among network device 206, computing device 202, and/or computing device 208.

As illustrated in FIG. 2, network 204 may include and/or represent various network devices and/or nodes that form and/or establish communication paths and/or segments. In one example, network 204 may include a network device 206 that forwards traffic between computing device 202 and computing device 208.

In some examples, and as will be described in greater detail below, one or more of modules 102 may cause network device 206 to (1) sample, over a certain period of time, traffic forwarded by network device 206 in accordance with prefixes 122 stored in FIB 120, (2) determine, based at least in part on the sampling of traffic, subset of prefixes 124 whose usages satisfy a certain threshold relative to prefixes 122 as a whole over the certain period of time, (3) compute, for subset of prefixes 124, a plurality of hit probabilities that each represent a relative likelihood that one of subset of prefixes 124 is used to forward the traffic by network device 206 over the certain period of time, (4) identify outgoing interfaces 126 that carry the traffic in connection with subset of prefixes 124, (5) identify a plurality of prefix-specific loads of outgoing interfaces 126 over the certain period of time, and then (6) predict a plurality of future traffic loads of outgoing interfaces 126 based at least in part on (A) the hit probabilities of subset of prefixes 124 and (B) the prefix-specific loads of outgoing interfaces 126.

In some examples, network device 206 and computing device 202 and 208 may each generally represent any type or form of physical computing device capable of reading computer-executable instructions. Examples of network device 206 and computing device 202 and 208 include, without limitation, routers (such as provider edge routers, hub routers, spoke routers, autonomous system boundary routers, and/or area border routers), switches, hubs, modems, bridges, repeaters, gateways (such as broadband network gateways), multiplexers, network adapters, network interfaces, client devices, laptops, tablets, desktops, servers, cellular phones, Personal Digital Assistants (PDAs), multimedia players, embedded systems, wearable devices, gaming consoles, variations or combinations of one or more of the same, and/or any other suitable network devices.

In some examples, network 204 may generally represent any medium or architecture capable of facilitating communication or data transfer. In one example, network 204 may include one or more of computing devices 202 and 208 even though these devices are illustrated as being external to network 204 in FIG. 2. Additionally or alternatively, network 204 may include other devices that facilitate communication among network device 206 and/or computing devices 202 and 208. Network 204 may facilitate communication or data transfer using wireless and/or wired connections. Examples of network 204 include, without limitation, an intranet, an access network, a layer 2 network, a layer 3 network, a MPLS network, an Internet Protocol (IP) network, a heterogeneous network (e.g., layer 2, layer 3, IP, and/or MPLS) network, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

FIG. 3 is a flow diagram of an exemplary computer-implemented method 300 for predicting future traffic loads of outgoing interfaces on network devices. The steps shown in FIG. 3 may be performed by any suitable computer-executable code and/or computing system, including system 100 in FIG. 1, system 200 in FIG. 2, system 400 in FIG. 4, system 1200 in FIG. 10, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may sample, over a certain period of time, traffic forwarded by a network device in accordance with prefixes stored in a FIB. For example, sampling module 104 may, as part of network device 206 in FIG. 2, sample traffic forwarded by network device 206 over a certain period of time. In one example, this traffic may be routed and/or forwarded in accordance with prefixes 122 stored in FIB 120. In this example, prefixes 122 may collectively define and/or dictate the routes and/or paths traversed by the traffic through network 204.

The systems described herein may perform step 310 in a variety of ways and/or contexts. In some examples, sampling module 104 may monitor network device 206 for packets arriving from certain devices within network 204 over a certain period of time. For example, sampling module 104 may monitor network device 206 for any packets arriving during a 1-hour sampling period. While monitoring network device 206 in this way over the 1-hour sampling period, sampling module 104 may receive, detect, and/or identify various packets arriving from computing device 202 and/or computing device 208.

Returning to FIG. 3, at step 320 one or more of the systems described herein may determine, based at least in part on the sampling of traffic, a subset of the prefixes whose usages satisfy a certain threshold relative to the prefixes as a whole over the certain period of time. For example, determination module 106 may, as part of network device 206 in FIG. 2, determine that the usages of subset of prefixes 124 satisfy a certain threshold relative to prefixes 122 as a whole over the certain period of time. In one example, subset of prefixes 124 may account for and/or represent approximately 10 percent of prefixes 122 as a whole. Additionally or alternatively, subset of prefixes 124 may be called and/or used by network device 206 to forward approximately 90 percent of the traffic.

The systems described herein may perform step 320 in a variety of ways and/or contexts. In some examples, determination module 106 may determine the relative usages and/or hit counts of prefixes 122. For example, identification module 110 may search FIB 120 for prefix statistics that identify and/or indicate the hit counts of prefixes 122 over the 1-hour sampling period. In this example, identification module 110 may identify, find, and/or gather prefix statistics 500 in FIG. 5 during the search. Determination module 106 may then determine that the usages and/or hit counts of subset of prefixes 124 satisfy a certain threshold (e.g., $90^{th}$ percentile of prefixes 122) over the 1-hour sampling period.

In some examples, prefix statistics 500 in FIG. 5 may correspond to and/or account for the embodiment of network device 206 in FIG. 4. As illustrated in FIG. 4, FIB 120 may be loaded and/or populated with prefixes 122. In one example, prefixes 122 may include and/or represent subset of prefixes 124 and prefixes 440(1)-(N). In this example, subset of prefixes 124 may include and/or represent prefixes 424, 426, 428, and/or 430.

In one example, subset of prefixes 124 may correspond to and/or represent only 10 percent of all prefixes 122. However, subset of prefixes 124 may correspond to and/or represent the highest traffic and/or most frequently hit prefixes within prefixes 122. For example, despite being so few in number, subset of prefixes 124 may account for approximately 90 percent of the traffic forwarded by network device 206 over the 1-hour sampling period.

In contrast, prefixes 440(1)-(N) may correspond to and/or represent 90 percent of all prefixes 122. In this example, prefixes 440(1)-(N) may correspond to and/or represent the lowest traffic and/or least frequently hit prefixes within prefixes 122. For example, despite being so many in number, prefixes 440(1)-(N) may account for only 10 percent of the traffic forwarded by network device 206 over the 1-hour sampling period.

As illustrated in FIG. 5, prefix statistics 500 may identify and/or indicate the usages and/or hit counts of prefixes 122. For example, prefix statistics 500 may identify and/or indicate that (1) prefix 424 has a hit count of 1,000,000, (2) prefix 426 has a hit count of 900,000, (3) prefix 428 has a hit count of 600,000, (4) prefix 430 has a hit count of 800,000, (5) prefix 440(1) has a hit count 20,000, (6) prefix 440(2) has a hit count of 25,000, (7) prefix 440(3) has a hit count of 0, and/or (8) prefix 440(4) has a hit count of 0. In some embodiments, prefix statistics 500 may also identify and/or indicate the usages and/or hit counts of additional prefixes that are not necessarily visible in FIG. 5.

In one example, determination module 106 may determine that prefix 424 is used to forward more of the traffic than a certain percentage (e.g., at least 90 percent) of prefixes 122 over the 1-hour sampling period. Additionally or alternatively, determination module 106 may determine that prefix 426 is used to forward more of the traffic than that same percentage (e.g., at least 90 percent) of prefixes 122 over the 1-hour sampling period.

Returning to FIG. 3, at step 330 one or more of the systems described herein may compute, for the subset of prefixes, a plurality of hit probabilities that each represent the relative likelihood that one of the subset of prefixes is used by the network device to forward the traffic over the certain period of time. For example, computation module 108 may, as part of network device 206 in FIG. 2, compute the hit probabilities of subset of prefixes 124 over the certain period of time. In this example, the hit probabilities may each represent the relative likelihood that one of subset of prefixes 124 is used by network device 206 to forward the traffic over the certain period of time.

The systems described herein may perform step 330 in a variety of ways and/or contexts. In some examples, computation module 108 may compute the hit probabilities of subset of prefixes 124 based at least in part on their relative usages and/or hit counts. In such examples, computation module 108 may obtain and/or access at least portions of prefix statistics 500 in FIG. 5. For example, computation module 108 may perform a hit probability computation 600 in FIG. 6 based at least in part on the hit count of prefix 424.

As part of hit probability computation 600, computation module 108 may rely on and/or implement a formula in which the hit count of prefix 424 is divided by the sum of all prefix hits for subset of prefixes 124. For example, computation module 108 may calculate the sum of all the hit counts of subset of prefixes 124 (in this example, 1,000,000+900,000+600,000+800,000="3,300,000") over the 1-hour sampling period. In this example, computation module 108 may then divide the hit count of prefix 424 by the sum of all the hit counts of subset of prefixes 124 to arrive at the hit probability of prefix 424 (in this example, "1,000,000÷3,300,000=30.3%"). The hit probability of prefix 424 may represent and/or indicate the relative likelihood that prefix 424 is used by network device 206 to forward the traffic during the 1-hour sampling period. In other words, the hit probability of prefix 424 may represent and/or indicate the amount of traffic forwarded by way of prefix 424 over the 1-hour sampling period.

In another example, computation module 108 may perform a hit probability computation 800 in FIG. 8 based at least in part on the hit count of prefix 426. As part of hit probability computation 800, computation module 108 may rely on and/or implement a formula in which the hit count of prefix 426 is divided by the sum of all prefix hits for subset of prefixes 124. For example, computation module 108 may divide the hit count of prefix 426 by the sum of all the hit counts of subset of prefixes 124 to arrive at the hit probability of prefix 426 (in this example, "900,000÷3,300,000=27.3%"). In this example, the hit probability of prefix 426 may represent and/or indicate the relative likelihood that that prefix 426 is used by network device 206 to forward the traffic during the 1-hour sampling period. In other words, the hit probability of prefix 426 may represent and/or indicate the amount of traffic forwarded by way of prefix 426 over the 1-hour sampling period.

Returning to FIG. 3, at step 340 one or more of the systems described herein may identify a plurality of outgoing interfaces that carry the traffic in connection with the subset of prefixes. For example, identification module 110 may, as part of network device 206 in FIG. 2, identify outgoing interfaces 126 that carry the traffic in connection with subset of prefixes 124. In this example, some packets sampled over the certain period of time may be forwarded via outgoing interfaces 126 of network device 206.

The systems described herein may perform step 340 in a variety of ways and/or contexts. In some examples, identification module 110 may search FIB 120 for entries and/or records that identify and/or indicate the outgoing interfaces associated with subset of prefixes 124. In one example, identification module 110 may be able to identify and/or extrapolate the outgoing interfaces associated with subset of prefixes 124 based at least in part on such entries and/or records. For example, identification module 110 may identify outgoing interfaces 126 as being associated with subset of prefixes 124. In this example, when a packet hits one of subset of prefixes 124, network device 206 may forward that packet to its next hop via one of outgoing interfaces 126.

Returning to FIG. 4, outgoing interfaces 126 of network device 206 may include and/or represent a subset of outgoing interfaces 226 and/or a subset of outgoing interfaces 228. In one example, subset of outgoing interfaces 226 may be responsible for forwarding and/or carrying the packets that hit one of subset of prefixes 124 (e.g., prefix 424). Additionally or alternatively, subset of outgoing interfaces 228 may be responsible for forwarding and/or carrying the packets that hit another one of subset of prefixes 124 (e.g., prefix 426). Although not illustrated in this way in FIG. 4, network device 206 may also include and/or represent one or more outgoing interfaces that are not associated with any of subset of prefixes 124. Accordingly, none of those outgoing interfaces may be responsible for forwarding and/or carrying any of the packets that hit subset of prefixes 124.

As illustrated in FIG. 4, subset of outgoing interfaces 226 may include and/or represent outgoing interfaces 402, 404, and 406 on network device 206. In addition, subset of outgoing interfaces 228 may include and/or represent outgoing interfaces 402, 408, and 410 on network device 206. Accordingly, subsets of outgoing interfaces 226 and 228 may have and/or share at least some of the same interfaces in common. In some embodiments, outgoing interfaces 126 may include and/or represent one or more additional subsets of outgoing interfaces that are not necessarily visible in FIG. 4.

As a specific example, identification module 110 may identify subset of outgoing interfaces 226 as being associated with prefix 424. In this example, identification module 110 may identify subset of outgoing interfaces 228 as being associated with prefix 426.

Returning to FIG. 3, at step 350 one or more of the systems described herein may identify a plurality of prefix-specific loads of the outgoing interfaces. For example, identification module 110 may, as part of network device 206 in FIG. 2, identify prefix-specific loads of outgoing interfaces 126. In this example, the prefix-specific loads may represent and/or constitute the relative load contributions made by and/or attributed to the subset of prefixes 124 across outgoing interfaces 126. Additionally or alternatively, the prefix-specific loads may represent and/or constitute the number of packets forwarded via outgoing interfaces 126 in connection with subset of prefixes 124 over the certain period of time.

The systems described herein may perform step 350 in a variety of ways and/or contexts. In some examples, identification module 110 may search FIB 120 for entries and/or records that identify and/or indicate the relative load distributions of subset of prefixes 124. In one example, identification module 110 may be able to identify and/or extrapolate the load distributions of each of prefixes 424, 426, 428, and/or 430 based at least in part on such entries and/or records. For example, identification module 110 may identify the traffic load of prefix 424 as being distributed at 40% to outgoing interface 402, 50% to outgoing interface 404, and 10% to outgoing interface 406. In another example, identification module 110 may identify the traffic load of prefix 426 as being distributed at 30% to outgoing interface 402, 25% to outgoing interface 408, and 45% to outgoing interface 410.

In some examples, computation module 108 may calculate weighted loads of outgoing interfaces 126 by multiplying the prefix-specific loads of outgoing interfaces 126 by the hit probabilities of subset of prefixes 124. For example, computation module 108 may perform a prefix-weighted load computation 700 in FIG. 7 based at least in part on the hit probability of prefix 424 and the prefix-specific load of outgoing interface 402. As part of prefix-weighted load computation 700, computation module 108 may rely on and/or implement a formula in which the hit probability of prefix 424 is multiplied by the prefix-specific load of outgoing interface 402. For example, computation module 108 may multiply the prefix-specific load of outgoing interface 402 by the hit probability of prefix 424 (in this example, "30.3%×40%=12.12%"). The resulting product of this multiplication may include and/or represent the prefix-weighted load of prefix 424. This prefix-weighted load may amount to and/or represent the individual contribution of prefix 424 to the traffic load of outgoing interface 402.

As another example, computation module 108 may perform a prefix-weighted load computation 900 in FIG. 9 based at least in part on the hit probability of prefix 426 and the prefix-specific load of outgoing interface 402. As part of prefix-weighted load computation 900, computation module 108 may rely on and/or implement a formula in which the hit probability of prefix 426 is multiplied by the prefix-specific load of outgoing interface 402. For example, computation module 108 may multiply the prefix-specific load of outgoing interface 402 by the hit probability of prefix 426 (in this example, "27.3%×30%=8.19%"). The resulting product of this multiplication may include and/or represent the prefix-weighted load of prefix 426. This prefix-weighted load may amount to and/or represent the individual contribution of prefix 426 to the traffic load of outgoing interface 402.

In some examples, computation module 108 may calculate totals of weighted loads of outgoing interfaces 126 by summing up the individual contributions of subset of prefixes 124 to the traffic loads of outgoing interfaces 126. For example, computation module 108 may perform a total weighted load computation 1000 in FIG. 10 based at least in part on the prefix-weighted loads of subset of prefixes 124. As part of total weighted load computation 1000, computation module 108 may rely on and/or implement a formula in which all relevant prefix-weighted loads are summed together. For example, computation module 108 may first initialize the total weighted load of outgoing interface 402 to zero. Computation module 108 may then add each of the individual contributions of subset of prefixes 124 to the total weighted load of outgoing interface 402 (in this example, "12.12%+8.19%+1.3%+1.1%=22.71%").

In one example, the "12.12%" contribution may correspond to, derive from, and/or be attributable to prefix 424. In this example, the "8.19%" contribution may correspond to, derive from, and/or be attributable to prefix 426. Additionally or alternatively, the "1.3%" contribution may correspond to, derive from, and/or be attributable to prefix 428. Finally, the "1.1%" contribution may correspond to, derive from, and/or be attributable to prefix 430.

Returning to FIG. 3, at step 360 one or more of the systems described herein may predict a plurality of future traffic loads of the outgoing interfaces based at least in part on the hit probabilities of the subset of prefixes and/or the prefix-specific loads of the outgoing interfaces. For example, prediction module 112 may, as part of network device 206 in FIG. 2, predict and/or estimate future traffic loads of outgoing interfaces 126 based at least in part on the hit probabilities and/or the prefix-specific loads of outgoing interfaces 126. As will be described in greater detail below, these predicted and/or estimated future traffic loads of outgoing interfaces 126 may be used by network device 206 to take certain corrective and/or remedial actions in anticipation of potential problems. Examples of such actions include, without limitation, load-balancing the outgoing interfaces to account for the predicted future traffic loads, upgrading at least one of the outgoing interfaces, modifying a configuration of at least one of the outgoing interfaces, combinations or variations of one or more of the same, and/or any other suitable actions.

The systems described herein may perform step 360 in a variety of ways and/or contexts. In some examples, prediction module 112 may perform future traffic predictions for all relevant outgoing interfaces. For example, prediction module 112 may perform a predicted future traffic load computation 1100 in FIG. 11. As part of predicted future traffic load computation 1100, computation module 108 may rely on and/or implement a formula in which the total weighted load of outgoing interface 402 is divided by the sum of all the total weighted loads.

For example, prediction module 112 may calculate the sum of all total weighted loads of outgoing interfaces 126 (in this example, "99%"). In this example, computation module 108 may then divide the total weighted load of outgoing interface 402 by the sum of all total weighted loads of outgoing interfaces 126 to arrive at the predicted future traffic load of outgoing interface 402 (in this example, "22.71%÷99%=22.94%"). This predicted future traffic load may represent an estimate of the amount of traffic that is expected to pass through outgoing interface 402 relative to all outgoing interfaces 126 during a future period of time.

In some examples, determination module 106 may compare the future traffic loads of outgoing interfaces 126 with one another. Determination module 106 may then determine, based at least in part on this comparison, that the predicted future traffic load of one of outgoing interfaces 126 exceeds the predicted future traffic load of another one of outgoing interfaces 126 by a specific threshold. For example, determination module 106 may determine that the predicted future traffic load of outgoing interface 402 exceeds the predicted future traffic load of outgoing interface 404 by several percentage points. Additionally or alternatively, determination module 106 may determine that the predicted future traffic load of outgoing interface 402 is greater than all other predicted future traffic loads of outgoing interfaces 126.

In some examples, correction module 114 may perform certain corrective and/or remedial actions to account for and/or accommodate the predicted future traffic loads of one or more of outgoing interfaces 126. For example, if the predicted future traffic load of outgoing interface 402 exceeds the specific threshold, correction module 114 may notify an administrator of the predicted future load and/or direct the administrator to replace outgoing interface 402 with an upgraded interface. In another example, if the predicted future traffic load of outgoing interface 402 exceeds the specific threshold, correction module 114 may perform a load-balancing operation on outgoing interface 402 to account for and/or accommodate the predicted future traffic loads of outgoing interfaces 126.

Figure 12:
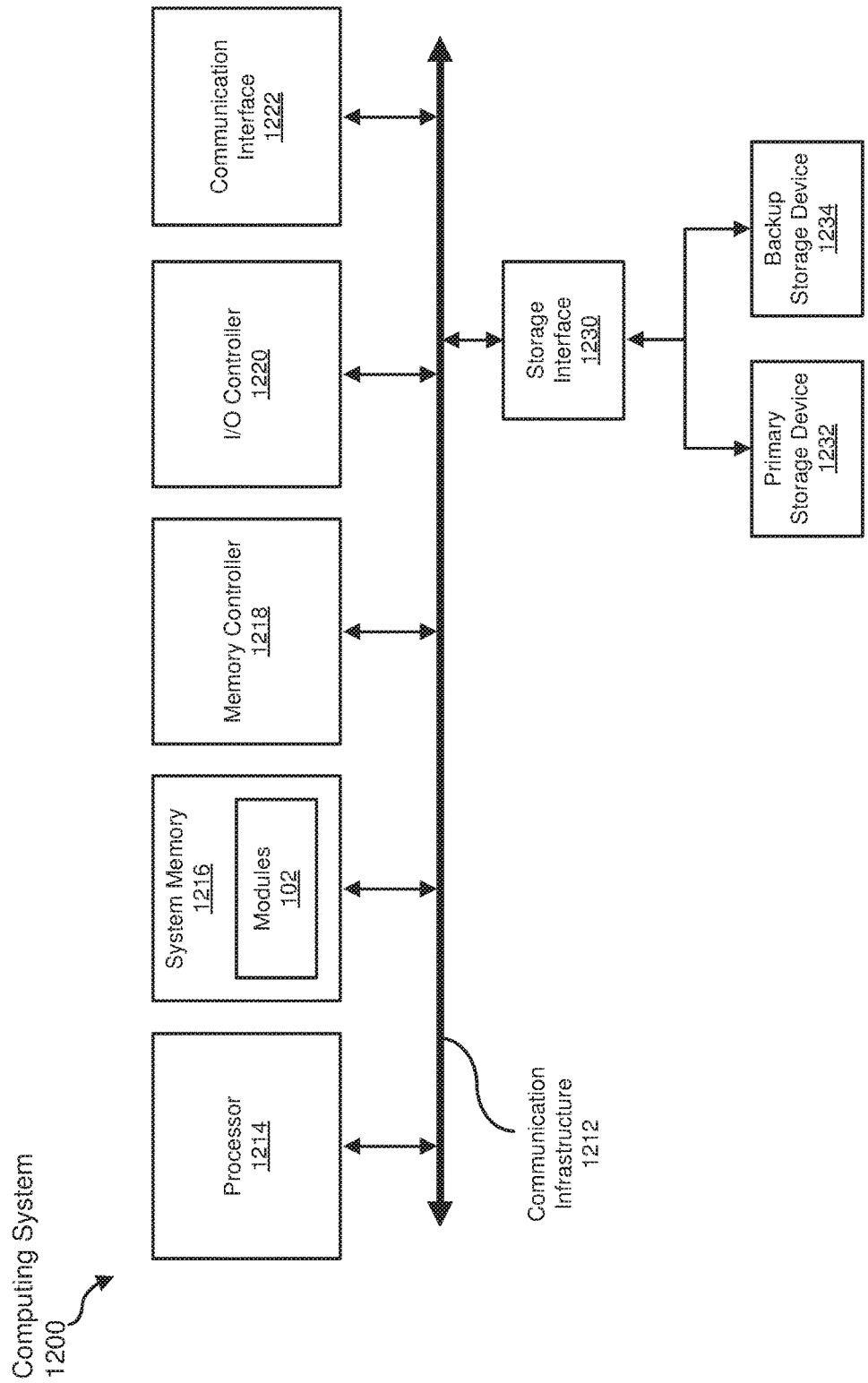
FIG. 12 is a block diagram of an exemplary computing system capable of implementing and/or being used in connection with one or more of the embodiments described and/or illustrated herein.

FIG. 12 is a block diagram of an exemplary computing system 1200 capable of implementing and/or being used in connection with one or more of the embodiments described and/or illustrated herein. In some embodiments, all or a portion of computing system 1200 may perform and/or be a means for performing, either alone or in combination with other elements, one or more of the steps described in connection with FIG. 3. All or a portion of computing system 1200 may also perform and/or be a means for performing and/or implementing any other steps, methods, or processes described and/or illustrated herein.

Computing system 1200 broadly represents any type or form of electrical load, including a single or multi-processor computing device or system capable of executing computer-readable instructions. Examples of computing system 1200 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 1200 may be programmed, configured, and/or otherwise designed to comply with one or more networking protocols. According to certain embodiments, computing system 1200 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 1200 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 1200 may include various network and/or computing components. For example, computing system 1200 may include at least one processor 1214 and a system memory 1216. Processor 1214 generally represents any type or form of processing unit capable of processing data or interpreting and executing instructions. For example, processor 1214 may represent an ASIC, a system on a chip (e.g., a network processor), a hardware accelerator, a general purpose processor, and/or any other suitable processing element.

Processor 1214 may process data according to one or more of the networking protocols discussed above. For example, processor 1214 may execute or implement a portion of a protocol stack, may process packets, may perform memory operations (e.g., queuing packets for later processing), may execute end-user applications, and/or may perform any other processing tasks.

System memory 1216 generally represents any type or form of volatile or non-volatile storage device or medium capable of storing data and/or other computer-readable instructions. Examples of system memory 1216 include, without limitation, Random Access Memory (RAM), Read Only Memory (ROM), flash memory, or any other suitable memory device. Although not required, in certain embodiments computing system 1200 may include both a volatile memory unit (such as, for example, system memory 1216) and a non-volatile storage device (such as, for example, primary storage device 1232, as described in detail below). System memory 1216 may be implemented as shared memory and/or distributed memory in a network device. Furthermore, system memory 1216 may store packets and/or other information used in networking operations.

In certain embodiments, exemplary computing system 1200 may also include one or more components or elements in addition to processor 1214 and system memory 1216. For example, as illustrated in FIG. 12, computing system 1200 may include a memory controller 1218, an Input/Output (I/O) controller 1220, and a communication interface 1222, each of which may be interconnected via communication infrastructure 1212. Communication infrastructure 1212 generally represents any type or form of infrastructure capable of facilitating communication between one or more components of a computing device. Examples of communication infrastructure 1212 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 1218 generally represents any type or form of device capable of handling memory or data or controlling communication between one or more components of computing system 1200. For example, in certain embodiments memory controller 1218 may control communication between processor 1214, system memory 1216, and I/O controller 1220 via communication infrastructure 1212.

In some embodiments, memory controller 1218 may include a Direct Memory Access (DMA) unit that may transfer data (e.g., packets) to or from a link adapter.

I/O controller 1220 generally represents any type or form of device or module capable of coordinating and/or controlling the input and output functions of a computing device. For example, in certain embodiments I/O controller 1220 may control or facilitate transfer of data between one or more elements of computing system 1200, such as processor 1214, system memory 1216, communication interface 1222, and storage interface 1230.

Communication interface 1222 broadly represents any type or form of communication device or adapter capable of facilitating communication between exemplary computing system 1200 and one or more additional devices. For example, in certain embodiments communication interface 1222 may facilitate communication between computing system 1200 and a private or public network including additional computing systems. Examples of communication interface 1222 include, without limitation, a link adapter, a wired network interface (such as a network interface card), a wireless network interface (such as a wireless network interface card), and any other suitable interface. In at least one embodiment, communication interface 1222 may provide a direct connection to a remote server via a direct link to a network, such as the Internet. Communication interface 1222 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 1222 may also represent a host adapter configured to facilitate communication between computing system 1200 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1222 may also enable computing system 1200 to engage in distributed or remote computing. For example, communication interface 1222 may receive instructions from a remote device or send instructions to a remote device for execution.

As illustrated in FIG. 12, exemplary computing system 1200 may also include a primary storage device 1232 and/or a backup storage device 1234 coupled to communication infrastructure 1212 via a storage interface 1230. Storage devices 1232 and 1234 generally represent any type or form of storage device or medium capable of storing data and/or other computer-readable instructions. For example, storage devices 1232 and 1234 may represent a magnetic disk drive (e.g., a so-called hard drive), a solid state drive, a floppy disk drive, a magnetic tape drive, an optical disk drive, a flash drive, or the like. Storage interface 1230 generally represents any type or form of interface or device for transferring data between storage devices 1232 and 1234 and other components of computing system 1200.

In certain embodiments, storage devices 1232 and 1234 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1232 and 1234 may also include other similar structures or devices for allowing computer software, data, or other computer-readable instructions to be loaded into computing system 1200. For example, storage devices 1232 and 1234 may be configured to read and write software, data, or other computer-readable information. Storage devices 1232 and 1234 may be a part of computing system 1200 or may be separate devices accessed through other interface systems.

Many other devices or subsystems may be connected to computing system 1200. Conversely, all of the components and devices illustrated in FIG. 12 need not be present to practice the embodiments described and/or illustrated herein. The devices and subsystems referenced above may also be interconnected in different ways from those shown in FIG. 12. Computing system 1200 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   sampling, over a certain period of time, traffic forwarded by a network device in accordance with prefixes stored in a forwarding information base;
   determining, based at least in part on the sampling of traffic, a subset of the prefixes whose usages satisfy a certain threshold relative to the prefixes as a whole over the certain period of time;
   computing, for the subset of prefixes, a plurality of hit probabilities that each represent a relative likelihood that a prefix included in the subset of prefixes is used by the network device to forward the traffic over the certain period of time, wherein computing the plurality of hit probabilities comprises:
      identifying amounts of usage for the subset of prefixes over the certain period of time;
      identifying, within the amounts of usage for the subset of prefixes, an amount of usage for the prefix included in the subset of prefixes over the certain period of time; and
      dividing the amount of usage for the prefix included in the subset of prefixes over the certain period of time by a sum of the amounts of usage for the subset of prefixes over the certain period of time;
   identifying a plurality of outgoing interfaces that carry the traffic in connection with the subset of prefixes;
   identifying a plurality of prefix-specific loads of the plurality of outgoing interfaces; and
   predicting a plurality of future traffic loads of the plurality of outgoing interfaces based at least in part on:
      the hit probabilities of the subset of prefixes; and
      the prefix-specific loads of the plurality of outgoing interfaces.

2. The method of claim 1, wherein the certain threshold relative to the prefixes as a whole comprises a $90^{th}$ percentile of the prefixes.

3. The method of claim 1, further comprising calculating weighted loads of the plurality of outgoing interfaces by multiplying the prefix-specific loads of the plurality of outgoing interfaces by the hit probabilities, wherein calculating the weighted loads of the plurality of outgoing interfaces comprises calculating one or more weighted loads of an outgoing interface included in the plurality of outgoing interfaces.

4. The method of claim 3, further comprising calculating totals of the weighted loads of the plurality of outgoing interfaces by summing individual contributions of the subset of prefixes to the prefix-specific loads of the plurality of outgoing interfaces, wherein calculating the totals of the weighted loads of the plurality of outgoing interfaces comprises calculating a total of the one or more weighted loads of the outgoing interface; and
wherein predicting the future traffic loads of the plurality of outgoing interfaces comprises dividing the total of the one or more weighted loads of the outgoing interface by a sum of the totals of the weighted loads of all the plurality of outgoing interfaces.

5. The method of claim 1, further comprising performing at least one corrective action to account for the predicted future traffic loads of the plurality of outgoing interfaces.

6. The method of claim 5, wherein the corrective action comprises at least one of:
load-balancing the plurality of outgoing interfaces to account for the predicted future traffic loads;
upgrading at least one outgoing interface included in the plurality of outgoing interfaces, and
modifying a configuration of at least one outgoing interface included in the plurality of outgoing interfaces.

7. The method of claim 5, further comprising:
comparing the predicted future traffic loads of the plurality of outgoing interfaces with one another; and
determining, based at least in part on the comparison, that a predicted future traffic load of an outgoing interface included in the plurality of outgoing interfaces exceeds a predicted future traffic load of another outgoing interface included in the plurality of outgoing interfaces by a specific threshold; and
wherein performing the corrective action comprises performing the corrective action to account for the predicted future traffic load of the outgoing interface exceeding the predicted future traffic load of the another outgoing interface by the specific threshold.

8. The method of claim 1, wherein:
the subset of prefixes comprises:
a first prefix; and
a second prefix;
the hit probabilities comprise:
a first hit probability; and
a second hit probability; and
the plurality of outgoing interfaces comprise:
a first subset of outgoing interfaces that carry the traffic in connection with the first prefix; and
a second subset of outgoing interfaces that carry the traffic in connection with the second prefix.

9. The method of claim 8, wherein determining the subset of prefixes whose usages satisfy the certain threshold relative to the prefixes comprises:
determining that the first prefix is used to forward more of the traffic than a certain percentage of the prefixes over the certain period of time; and
determining that the second prefix is used to forward more of the traffic than the certain percentage of the prefixes over the certain period of time.

10. The method of claim 8, wherein computing the hit probabilities of the subset of prefixes comprises:
computing the first hit probability, which represents an amount of the traffic forwarded by way of the first prefix over the certain period of time; and
computing the second hit probability, which represents an amount of the traffic forwarded by way of the second prefix over the certain period of time.

11. The method of claim 10, wherein:
the first subset of outgoing interfaces that carry the traffic in connection with the first prefix comprises:
a first outgoing interface; and
a second outgoing interface; and
predicting the future traffic loads of the plurality of outgoing interfaces comprises:
calculating a first prefix-weighted load of the first outgoing interface by multiplying a prefix-specific load of the first outgoing interface by the first hit probability;
adding the first prefix-weighted load of the first outgoing interface to a total weighted load of the first outgoing interface; and
calculating a future traffic load of the first outgoing interface by dividing the total weighted load of the first outgoing interface by a sum of all total weighted loads of the plurality of outgoing interfaces.

12. The method of claim 11, wherein:
the second subset of outgoing interfaces that carry the traffic in connection with the second prefix comprises the first outgoing interface; and
predicting the future traffic loads of the plurality of outgoing interfaces comprises:
calculating a second prefix-weighted load of the first outgoing interface by multiplying a prefix-specific load of the first outgoing interface by the second hit probability; and
adding the second prefix-weighted load of the first outgoing interface to the total weighted load of the first outgoing interface.

13. A system comprising:
a sampling module, stored in memory, that samples, over a certain period of time, traffic forwarded by a network device in accordance with prefixes stored in a forwarding information base;
a determination module, stored in memory, that determines, based at least in part on the sampling of traffic, a subset of the prefixes whose usages satisfy a certain threshold relative to the prefixes as a whole over the certain period of time;
a computation module, stored in memory, that computes, for the subset of prefixes, a plurality of hit probabilities that each represent a relative likelihood that a prefix included in the subset of prefixes is used by the network device to forward the traffic over the certain period of time, wherein computing the plurality of hit probabilities comprises:
identifying amounts of usage for the subset of prefixes over the certain period of time;
identifying, within the amounts of usage for the subset of prefixes, an amount of usage for the prefix included in the subset of prefixes over the certain period of time; and
dividing the amount of usage for the prefix included in the subset of prefixes over the certain period of time by a sum of the amounts of usage for the subset of prefixes over the certain period of time;
an identification module, stored in memory, that:
identifies a plurality of outgoing interfaces that carry the traffic in connection with the subset of prefixes; and
identifies a plurality of prefix-specific loads of the plurality of outgoing interfaces;
a prediction module, stored in memory, that predicts a plurality of future traffic loads of the plurality of outgoing interfaces based at least in part on:
the hit probabilities of the subset of prefixes; and
the prefix-specific loads of the plurality of outgoing interfaces; and
at least one physical processor configured to execute the sampling module, the determination module, the computation module, the identification module, and the prediction module.

14. The system of claim 13, wherein the certain threshold relative to the prefixes as a whole comprises a 90$^{th}$ percentile of the prefixes.

15. The system of claim 13, wherein the computation module calculates weighted loads for the plurality of outgoing interfaces by multiplying the prefix-specific loads of the plurality of outgoing interfaces by the hit probabilities, wherein calculating the weighted loads of the plurality of outgoing interfaces comprises calculating one or more weighted loads of an outgoing interface included in the plurality of outgoing interfaces.

16. The system of claim 15, wherein:
the computation module calculates totals of the weighted loads of the plurality of outgoing interfaces by summing individual contributions of the subset of prefixes to the prefix specific loads of the plurality of outgoing interfaces, wherein calculating the totals of the weighted loads of the plurality of outgoing interfaces comprises calculating a total of the one or more weighted loads of the outgoing interface; and
the prediction module predicts the future traffic loads of the plurality of outgoing interfaces comprises dividing the total of the one or more weighted loads of the outgoing interface by a sum of the totals of the weighted loads of all the plurality of outgoing interfaces.

17. The system of claim 13, further comprising a correction module, stored in memory, that performs at least one corrective action to account for the predicted future traffic loads of the plurality of outgoing interfaces; and
wherein the physical processor is further configured to execute the correction module.

18. A non-transitory computer-readable medium comprising one or more computer-executable instructions that, when executed by at least one processor of a computing device, cause the computing device to:
sample, over a certain period of time, traffic forwarded by a network device in accordance with prefixes stored in a forwarding information base;
determine, based at least in part on the sampling of traffic, a subset of the prefixes whose usages satisfy a certain threshold relative to the prefixes as a whole over the certain period of time;
compute, for the subset of prefixes, a plurality of hit probabilities that each represent a relative likelihood that a prefix included in the subset of prefixes is used by the network device to forward the traffic over the certain period of time, wherein computing the plurality of hit probabilities comprises:
identifying amounts of usage for the subset of prefixes over the certain period of time;
identifying, within the amounts of usage for the subset of prefixes, an amount of usage for the prefix included in the subset of prefixes over the certain period of time; and
dividing the amount of usage for the prefix included in the subset of prefixes over the certain period of time by a sum of the amounts of usage for the subset of prefixes over the certain period of time;
identify a plurality of outgoing interfaces that carry the traffic in connection with the subset of prefixes;
identify a plurality of prefix-specific loads of the plurality of outgoing interfaces; and
predict a plurality of future traffic loads of the plurality of outgoing interfaces based at least in part on:
the hit probabilities of the subset of prefixes; and
the prefix-specific loads of the plurality of outgoing interfaces.

* * * * *